(12) United States Patent
Daniels

(10) Patent No.: US 7,344,467 B2
(45) Date of Patent: Mar. 18, 2008

(54) SELF-REGULATING CONTINUOUSLY VARIABLE TRANSMISSION

(76) Inventor: Clifford Orval Daniels, P.O. Box 803, 339-10th Ave. S.E., Calgary, Alberta (CA) T2G 0W2

( * ) Notice: Subject to any disclaimer, the term of this patent is extended or adjusted under 35 U.S.C. 154(b) by 114 days.

(21) Appl. No.: 11/342,035

(22) Filed: Jan. 30, 2006

(65) Prior Publication Data
US 2006/0240936 A1    Oct. 26, 2006

(51) Int. Cl.
F16H 1/32        (2006.01)
F16H 3/70        (2006.01)
(52) U.S. Cl. .......................... 475/177; 475/169
(58) Field of Classification Search ........... 475/162, 475/163, 169, 172, 176, 177, 181, 207, 208, 475/219
See application file for complete search history.

(56) References Cited

U.S. PATENT DOCUMENTS

| | | | | |
|---|---|---|---|---|
| 2,108,062 A | * | 2/1938 | Hall | 74/113 |
| 2,149,560 A | * | 3/1939 | Teece | 475/255 |
| 3,662,964 A | * | 5/1972 | Rossler | 241/222 |
| 3,886,805 A | * | 6/1975 | Koderman | 74/52 |
| 2004/0235603 A1 | * | 11/2004 | Peck | 475/169 |

* cited by examiner

Primary Examiner—Roger Pang

(57) ABSTRACT

A self regulating continuously variable torque transmission in which two planetary gears of lesser diameter drive two internal gears of greater diameter by orbiting and rotating around an output shaft which forms the rotational axis of the ring gears. Planetary gear orbit is constant while rotation is variable. Loads greater than available torque cause the ring gears to rotate at a lesser velocity than torque input, causing the planetary gears to rotate at a lesser velocity than torque input. To compensate for this, a carrier mounted on the output shaft rotates at a reduced velocity, reducing planetary gear rotation. This carrier provides two diametrically opposed axes, one each for two crankshafts which rotate on these axes during reduced planetary gear rotation, carrying each planetary gear in orbit around a separate axis. These two movements are created by an input crankshaft with one throw and a second crankshaft mounted by bearings on the input throw. The second crankshaft is comprised of two throws, each diametrically opposed to the other relative to the input throw. The second crankshaft transmits torque from the input axis to two separate axes offset from the input axis. Two connecting rods transmit torque from the second crankshaft to the planetary gear crankshafts.

1 Claim, 3 Drawing Sheets

SELF-REGULATING CONTINUOUSLY VARIABLE TRANSMISSION

Figure 1:
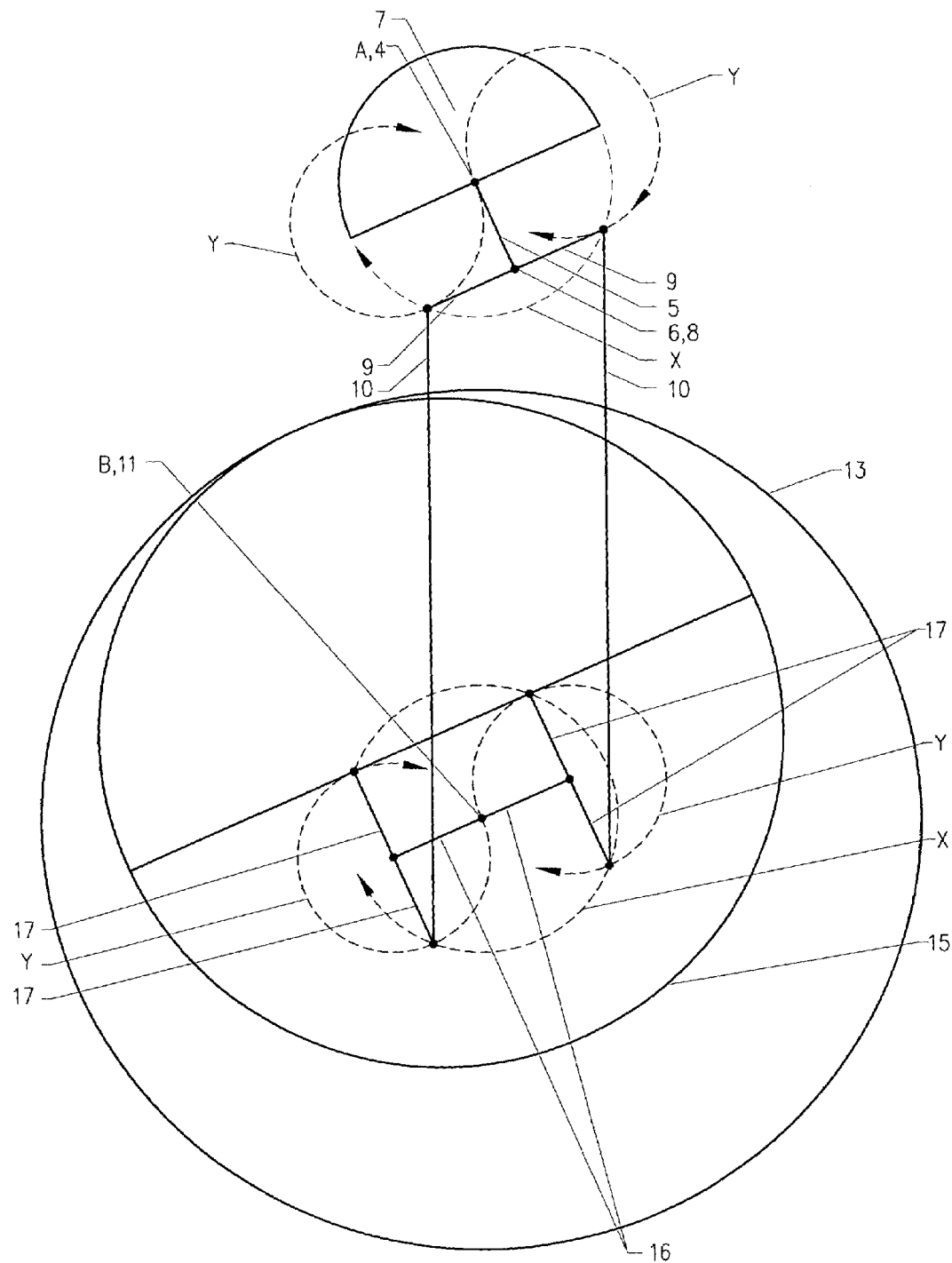

This invention relates to prior application U.S. Ser. No. 11/107,970 now abandoned.

FIELD OF THE INVENTION

This invention relates to continuously variable automotive torque transmissions and to torque transmissions in stationary powered systems where an engine producing a relatively constant torque output drives variable loads.

BACKGROUND OF THE INVENTION

All continuously variable automotive transmissions require constant control input to balance available torque with constantly varying loads. To ensure a smooth transition from one torque multiplication ratio to another, control input must be simultaneous with any change of load relative to torque input. This requires the transmission to change operation by inherently reacting to any change in load relative to torque input or to have a control mechanism which can monitor this change. In order for a control mechanism to function, there must be some flexibility in a component of the transmission to allow a movement which is controlled by torque and load. This movement controls transmission operation.

Currently, the only continuously variable transmission in production are variations of the type in which torque is transmitted by a belt or chain between two cones or discs with variable circumferences. By varying the circumferences of the cones or discs, a range of torque multiplication ratios is created. This system has the advantage that the belts or chains are flexible and thus load can be monitored by an idler pulley or sprocket which is moved by belt or chain tension. The centrifugal force generated by torque input creates a second control input action. Any continuously variable transmission comprised of rigid non flexible components lacks this ability.

In patent U.S. 2004/0235603, a continuously variable transmission is described in which external control input is required. This requires a control mechanism which adds cost and complexity, and, as all the components are rigid, makes it difficult to design a control system.

In patent U.S. Pat. No. 2,108,062, a continuously variable transmission is described in which a hydraulic principle is used. The disadvantage of this is that hydraulic systems are expensive to manufacture, requiring precision pistons and cylinders. Also, such systems generate considerable mechanical and fluid friction which reduces overall efficiency.

In patent U.S. Pat. No. 2,149,560, a continuously variable transmission is described in which the inertia of oscillating masses absorb any differences in angular velocity between torque input and load. Torque is absorbed by inertia and exerted against load as momentum. The problem with this system is that a large mass is required so as to have enough inertia and momentum to handle automotive torque requirements. Also, this invention describes oscillating mass movements which may generate vibration.

My invention is a simple, inherently self regulating torque transmission system in which all component mass movements are rotational so as to be fully counter-balanced by the mass of other components. All components are rigid and strongly supported to withstand high rates of torque transmission. A wide range of torque multiplication ratios is created.

SUMMARY OF THE INVENTION

In this system two external planetary gears (15) of equal lesser diameter drive two internal ring gears (13) of equal greater diameter by orbital and rotational movement. Internal ring gears (13) are two hollow cylinders which have a common output shaft (11) which forms the rotational axis (B) and diameter axis center of gears (13). Each said cylinder has an internal ring gear (13) on the inner circumference which is intermeshed with one said external planetary gear (15).

During direct drive, when the torque exerted into planetary gears (15) equals the load opposing ring gear (13) rotation, planetary gears (15) orbit and rotate around axis (B) in the angular direction of torque input (X) at torque input velocity driving ring gears (13) at torque input velocity. Loads greater than torque input (X) inherently cause ring gears (13) to rotate at a lesser velocity than torque input (X) and said difference in velocity is proportional to the ratio of load over torque input.

To compensate for said difference in velocity, planetary gears (15) counter-rotate in the opposite angular direction of torque input (X) and said counter-rotation combines with torque input to drive planetary gears (15) in the angular direction of torque input around different axes.

At maximum load, planetary gears (15) counter-rotate in the opposite angular direction of torque input, one revolution per one full orbit in the angular direction of torque input (X). Thus planetary gears (15) with diameters equal to ninety percent of the diameters of ring gears (13) would compensate for ninety percent of torque input velocity leaving ten percent to drive ring gears (13). Such a system would have a maximum torque multiplication ratio of one to ten and a maximum angular velocity reduction of ten to one. During direct drive, both planetary gears (15) are driven in orbit and rotation around output axis (B). Under maximum load, each planetary gear (15) is carried around a separate axis offset from axis (B).

Said two separate axes are provided by a carrier (shafts 16) which is mounted by bearings (2) on output shaft (11) between said two ring gears (13). Said carrier consists of two hollow shafts (16) which form a single integral unit. The diameter axis center of each shaft (16) is offset from the rotational axis (B) of said carrier provided by output shaft (11). The direction of said offset of each carrier shaft (16) is diametrically opposite the other relative to axis (B). Said carrier is free to remain stationary on output shaft (11) or to rotate in the direction of torque input at variable velocities up to torque input (X) velocity.

One of two carrier crankshafts (cams 17) is mounted by bearings (2) on each carrier shaft (16). Said carrier crankshafts each consists of two throw cams (17) which form a single integral unit. Each throw cam (17) is a short cylinder, the diameter axis center of which is offset from the rotational axis provided by the respective carrier shaft (16) to which it is mounted.

The direction of said offset of each cam (17) is diametrically opposite to the other cam (17) relative to said rotational axis provided by shaft (16). Thus each said carrier crankshaft has two diametrically opposed throws (17). Said carrier crankshafts are free to remain stationary on carrier shafts (16) and travel in orbit around axis (B) (movement X) with shafts (16) or to rotate around shafts (16) (movement Y) when said carrier is stationary on axis (B) or a combination of said two movements (X and Y).

One length axis end of one connecting rod (10) is mounted by a bearing (2) on the circumference of one said throw cam (17) of each carrier crankshaft. One planetary gear (15) is mounted by bearing (2) on the other throw shaft (17) so that the diameter axis center of said gear (15) is offset from said cam (17). The direction of said offset is diametrically opposite the direction of offset of said carrier shaft (16), relative to axis "B", to which each gear (15) is mounted, by each carrier crankshaft (17).

Connecting rods (10) transmit torque from the input axis (A) to output axis (B) and torque reaction from axis (B) to axis (A).

Said two movements (X and Y) are generated by the input axis (A) assembly of components. Said assembly consists of an input crankshaft and a secondary crankshaft. Said input crankshaft consists of two input axis shafts (4), a throw shaft (6), two radial arms (5), which connect the orbital throw shaft (6) with the rotational input shafts (4), and two counter-balances (7).

One length axis end of one input axis shaft (4) is connected to, and driven in rotation, by a torque source, thus driving said input crankshaft around axis (A).

A secondary crankshaft is mounted by bearings (2) on orbital throw shaft (6) and travels in orbit around axis (A) with shaft (6). Said secondary crankshaft is free to remain stationary on shaft (6) or to counter-rotate around shaft (6) is the opposite angular director of torque input (X).

Said secondary crankshaft consists of an axis shaft (8) and two throw cams (9). Axis shaft (8) is a hollow cylinder mounted by bearings (2) on throw shaft (6) so that the length axis of said cylinder is concentric with the length axis of shaft (6).

Throw cams (9) are two short cylinders which are integral parts of axis shaft (8). The diameter axis center of each cam (9) is offset from the rotational axis (shaft 6) of axis shaft (8). The direction of said offset of each cam (9) is diametrically opposite the other cam (9) relative to said rotational axis, thus said secondary crankshaft has two diametrically opposed throws.

One length axis end of one connecting rod (10) is mounted by a bearing (2) on the circumference of each throw cam (9). Rods (10) transmit torque from throw cams (9) on input axis (A) to carrier crank throw cams (17) on output axis (B) and torque reaction from axis (B) back to axis (A).

During direct drive, when torque input equals load, carrier shafts (16) rotate around axis (B) at torque input (X) velocity carrying said carrier crankshafts (cams 17) in orbit and rotation around axis (B) thus driving planetary gears (15) in orbit and rotation around axis (B) (movement X). Thus movement (X) drives ring gears (13) at torque input (X) velocity.

During movement (X), said secondary crankshaft remains stationary on throw shaft (6) and said diameter axis centers of throw cams (9) orbit around axis (A) generating an orbital cranking movement (X) around input axis (A).

Under a maximum load over torque input ratio, said carrier (shafts 16) are stationary on axis (b) and each said carrier crankshaft (cams 17) rotates around one said axis offset from axis (B) provided by each carrier shaft (16) (movement Y). In this mode of operation, said secondary crankshaft (shaft 8, cams 9) counter-rotate one full counter-revolution in the opposite angular direction of torque input (X) per one full orbit of said secondary crankshaft in the angular direction of torque input (X). The two throw radii of cams (9) remain parallel to a fixed plane in space and transmit torque from input axis (A) to two separate axes offset from axis (A) (movement Y).

Secondary crankshaft (shaft 8, cams 9) is limited to one counter-rotation per one rotation of torque input (X) as movement (Y) is in the angular direction of torque input (X) and any greater counter-rotation would increase the velocity and distance of stroke of one connecting rod (10) and decrease the velocity and distance of stroke of the other rod (10) between axis (A) and (B). This would drive each said carrier crankshaft (cams 17) at a different velocity which is impossible as each said carrier crankshaft is engaged equally with a single load.

Said throw radii of cams (9) act as the two radial arms of a lever with throw shaft (6) being the fulcrum. Torque reaction exerted against each cam (9) combines with torque input (X) from shaft (6) to drive the other cam (9) in the angular direction of torque input during both movements (X) and (Y). Thus a continuous feed back loop is created between input axis (A) and output axis (B).

The point at which torque is exerted into axis (B) is between axis (B), which acts as the fulcrum of a lever, and ring gears (13), which are the load. As axis (B) is fixed and said load is free to rotate around axis (B), load bearing ring gears (13) react to torque input by rotating around axis (B) at an angular velocity proportional to the load opposing ring gear (13) rotation relative to the torque exerted into the radial arm of said lever formed by the radii of ring gears (13).

FIG. 1

FIG. 1 is a simple "skeleton" drawing in which the various components are represented by lines or circles. The viewer's line of sight is parallel to the rotational or orbital axes of all components.

The two different torque transmission movements are represented by semi-circles composed of dashes with an arrow head at one point in said semi-circle which represents the angular direction of travel.

The juncture between the various moving components and thus the bearings which form the rotational axes of said components are represented by solid dots.

FIG. 2

Figure 2:
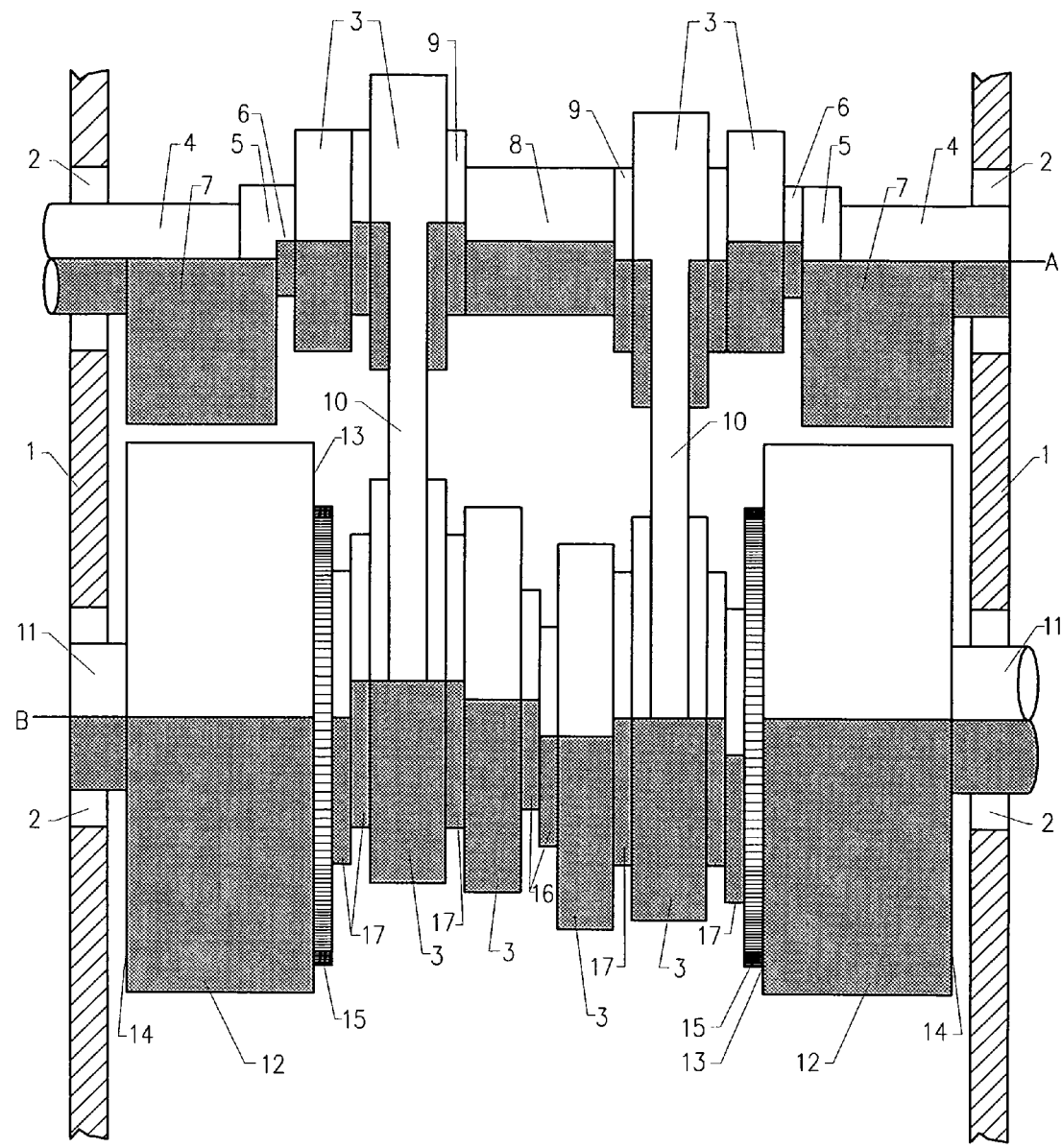
Figure 2A:
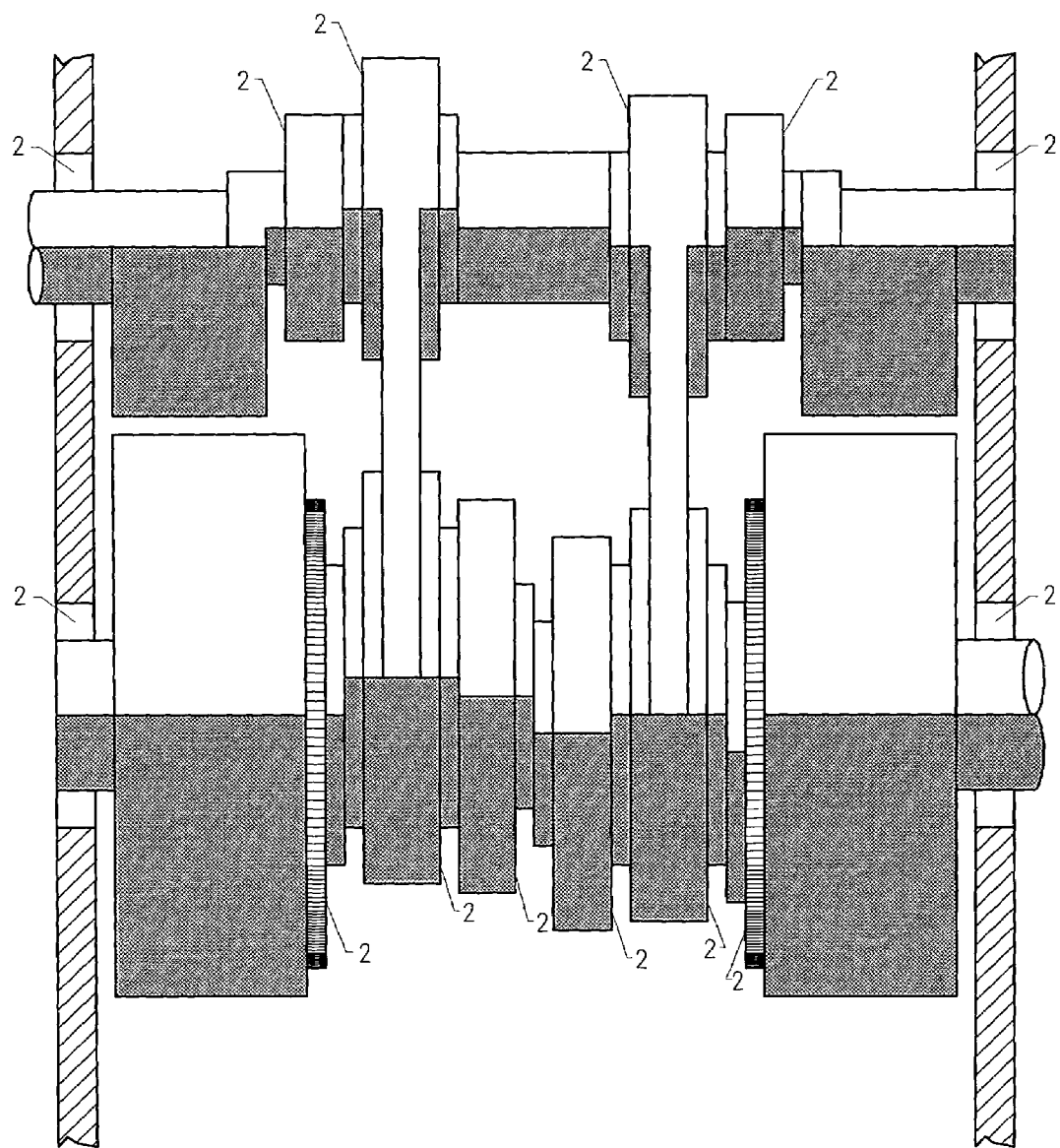

In FIG. 2 the viewer's line of sight is at a right angle relative to the rotational or orbital axes of all components.

All shaded components are cylindrical with the viewer's line of sight at right angle relative to the length axes of said cylinders. Illumination is from directly above, thus the bottom half of said cylinders are in shade. The demarcation between shaded and unshaded areas represent the diameter axis centers of said cylindrical components and demonstrates the distance and direction of offset between said components.

The throw radii of the four crankshafts are each one eighth of one inch and the difference in diameter between the planetary gears and ring gears is one quarter of one inch.

The two bearing supports (3) which support carrier shafts (16) on output shaft (11) are each inside one ring (12) and are thus not visible. One support (3) of each carrier crankshaft (cams 17) are also inside each ring (12) and are thus not visible. The said unseen supports (3) are identical in form and function as the visible supports (3).

With the exception of the two bearings (2) which support input shaft (4) in casing (1) and the two bearings (2) which support output shaft (11) in casing (1) all bearings (2) are inside outer components and are thus not visible. The numbered line (2) indicates one point on the outer circumference of each bearing (2).

DETAILED DESCRIPTION OF THE INVENTION

The following factors are considered in the design of this invention.

Structural Strength

All moving components are supported by two bearings (2) and all torsional loads on said components are between said bearing (2) supports. The exception being the two planetary gears (15) which are each supported on one carrier throw cam (17) by one bearing (2). The support provided by said single bearing (2) is directly aligned with the torsional load to which each planetary gear (15) is subjected.

Mass Balancing

To prevent the generation of vibration due to asymmetric mass distribution around axis (A), the mass of all components which rotate on axis (A) is balanced on axis (A) by counter-balances (7). The mass of planetary gears (15) is balanced on axis (B) by the mass of connecting rods (10) which is diametrically opposed to the mass of gears (15) relative to axis (B).

Friction

All moving components are supported by ring type roller or ball bearings (2) which generate very little friction.

Inertia

The mass of the moving components and the radius of orbit of said mass around the various axes is minimized to reduce the radius of travel of said mass. This minimizes the inertia of said mass during changes in angular velocity of said moving components and thus any negative effect said inertia has on performance and efficiency.

Overall Mass, External Dimensions and Cost

This invention consists of ten moving components and eighteen bearings and is light weight, compact and inexpensive to manufacture.

While there are many methods to construct this device, the model described herein is the most ideal mechanical embodiment.

1. Stationary Casing

Said casing (1) encloses all the moving components in a lubricating oil bath and provides a stationary mount for the input shaft (4) and output shaft (11).

2. Bearings

Said bearings (2) are ring shaped roller or ball type bearings (2) which eliminate friction between the various moving components.

3. Bearing Supports

Said supports (3) are hollow cylinders which are integral parts of said moving components and each contain a bearing (2) which supports each said moving component. Said supports (3) of secondary crankshaft (8, 9) carrier crankshafts (17) and carrier (16) are each detachable from these said components to allow assembly of other components to these components.

4. Input Axis Shafts

Said axis shafts (4) are two short cylinders which are integral parts of the input crankshaft. One length axis end of each shaft (4) is supported by a bearing (2) in one opposite end wall of casing (1). One length axis end of one shaft (4) is connected to, and driven in rotation around the cylindrical length axis (A) of shafts (4) by a torque source.

5. Radial Arms

Said arms (5) are integral parts of said input crankshaft and connect one length axis end of each rotational input shaft (4) with one length axis end of the orbital throw shaft (6).

6. Throw Shaft

Said shaft (6) is an integral part of said input crankshaft. The length axis of shaft (6) is parallel to the rotational and length axes (A) of input shafts (4) and travels in an orbit around axis (A) with input crankshaft rotation. Shaft (6) is composed of two pieces to allow assembly of other components to shaft (6). One piece of said secondary crankshaft consists of one input shaft (4), one radial arm (5) and one part of throw shaft (6). One said part of shaft (6) is a hollow cylinder. The second said part of shaft (6) is a solid cylinder which has a diameter equal to the inner diameter of said hollow cylinder. After assembly of said other components to said outer hollow cylinder, said solid cylinder is inserted inside said hollow cylinder to form a single integral crankshaft.

7. Counter-Balances

Said counter-balances (7) are each an integral part of one input shaft (4) and are attached to each shaft (4) so that the mass of both counter-balances are diametrically opposite to radial arms (4). Counter-balances (7) are of sufficient mass and radius of orbit around input axis (A) so as to generate a centrifugal force equal to the centrifugal force generated by throw shaft (6) and components mounted on shaft (6).

8. Secondary Crank Axis Shaft

Said secondary axis shaft (8) is a hollow cylinder, each length axis end of which is supported by a bearing (2) and support (3) on throw shaft (6) and is free to counter-rotate on shaft (6).

9. Secondary Crank Throw Cams

Said secondary cams (9) are two short cylinders which are integral parts of secondary axis shaft (8). The diameter axis center of each cam (9) is offset from the rotational axis (shaft 6) of axis shaft (8). The distance of said offset is equal to the throw radius of said input crankshaft. The direction of said offset of each cam (9) is diametrically opposite the direction of offset of the other cam (9) relative to said rotational axis (shaft 6) of said secondary crankshaft. Thus shaft (8) and cams (9) form a crankshaft with two diametrically opposed throws.

10. Connecting Rods

Said rods (10) are each an elongated bar. One length axis end of each rod (10) is mounted by a bearing (2) and support (3) on the circumference of one throw cam (9). Rods (10) transmit torque from input axis (A) to output axis (B).

11. Output Axis Shaft

Said output shaft (11) is a cylinder, each length axis end of which is supported by a bearing (2) in each opposite end wall of casing (1). Shaft (11) rotates on it's cylindrical length axis (B) and one length axis end is connected to a load which is driven in rotation. Output shaft (11) is composed of two pieces to allow assembly of other components to shaft (11). One said piece of shaft (11) is a hollow cylinder with splines on the inner circumference. The other said piece is a solid cylinder with spline slots on the circumference. Said solid cylinder has an outer circumference equal to the inner circumference of said hollow piece and said solid piece is inserted into said hollow piece after assembly of said other components to shaft (11).

12. Rings

Said rings (12) are two hollow cylinders which are integral parts of output shaft (11) which forms the rotational axis (B) and diameter axis center of rings (12).

13. Internal Ring Gears

Said ring gears (13) are two internal gears, each one of which is located on the inner circumference of each ring (12).

14. Ring Support Discs

Said discs are integral parts of output shaft (11) and support rings (12) on shaft (11).

15. External Planetary Gears

Said planetary gears (15) are two external gears, each one of which is intermeshed with one internal ring gear (13).

16. Carrier Shafts

Said shafts (16) are two hollow cylinders which form a single integral unit. One length axis end of each cylinder is joined to the other and each length axis end of said unit is supported by bearings (2) and supports (3) on output shaft (11) between said two ring gears (13). The diameter axis center of each shaft (16) is offset from the rotational axis (B) of said shafts (16). The distance of said offset is equal to said throw radius of said input crankshaft or the throw radii of secondary throw cams (9). The direction of said offset of each shaft (16) is diametrically opposite the direction of offset of the other shaft (16) relative to output axis (B).

Said carrier (16) is subject to torque input and torque reaction and rotates on axis "B" in the angular direction of torque input over a range from zero to torque input velocity.

17. Carrier Crank Throw Cams

Said carrier throw cams (17) are four short cylinders which form two separate integral units with two cams (17) each. Each said unit is mounted by bearings (2) and supports (3) on one carrier shaft (16). The diameter axis center of each cam (17) of each said unit is offset from the rotational axis (shaft 16) of each said unit.

The distance of said offset is equal to said throw radius of said input crankshaft. The direction of said offset of each cam (17) of each said unit is diametrically opposite to the direction of offset of the other cam (17) relative to the rotational axis (shaft 16) of said unit. Thus each said unit forms a crankshaft with two diametrically opposed throws.

One length axis end of one connecting rod (10) is mounted by a bearing (2) and support (3) on the circumference of one carrier throw cam (17) of each said unit formed by two cams (17).

One planetary gear (15) is mounted by a bearing (2) on the other throw cam (17) of each said unit. The diameter axis center of each planetary gear (15) is offset from said diameter axis center of the cam (17) to which each gear (15) is mounted. The distance of said offset is equal to the distance of said offset of each carrier shaft (16) from axis (B). The direction of said offset of each gear (15) is diametrically opposite, relative to axis (B), the direction of said offset of the shaft (16) to which each gear (15) is mounted by said carrier crankshaft (cams 17).

During direct drive when torque input equals load, said carrier (shafts 16) rotates on axis (B) at torque input velocity in the angular direction of torque input. Said carrier crankshafts (cams 17) orbit axis (B) with carrier shaft (16) rotation driving planetary gears in orbit and rotation around axis (B). Thus movement (X) drives internal ring gears (13) and output shaft (11) at torque input (X) velocity in the angular direction of torque input (X).

Loads greater than torque input inherently cause output shaft (11) and ring gears (13) to rotate at a lesser velocity than torque input. Said difference in velocity is proportional to said load over torque input ratio. To compensate for said difference in velocity, said carrier (shafts 16) rotates on axis (B) at a lesser velocity than torque input (X) thus carrying said carrier crankshafts (cams 17) around axis (B) at a lesser orbital velocity than torque input (X).

Under a maximum load over torque input ratio, said carrier (shafts 16) is stationary on axis (B) and said carrier crankshaft (cams 17) orbit around axis (B) is zero. In this mode of operation (movement Y), each said carrier crankshaft (cams 17) rotates around the carrier shaft (16) to which it is mounted.

As the diameter axis center of each planetary gear (15) is offset from the cam (17) to which it is mounted; and said offset is diametrically opposite to the direction of offset of the respective carrier crankshaft of said cam (17), relative to axis (B), planetary gears (15) orbit around axis (B) during both movements (X and Y).

During movement (Y), the diameter axes of planetary gears (15) remain parallel to a fixed plane in space while each gear (15) is carried around an axis offset from axis (B). This is the equivalent of planetary gears (15) counter-rotating in the opposite angular direction of torque input (X) one full counter-revolution per one full orbit of planetary gears (15) around axis (B) in the angular direction of torque input (X). Planetary gears (15) which have diameters equal to ninety percent of the diameters of ring gears (13) would compensate for ninety percent of torque input velocity. Such a system will have a maximum torque multiplication ratio of one to ten and a maximum angular velocity reduction of ten to one.

Movements (X) and (Y) are generated by said secondary crankshaft (shaft 8, cams 9). During direct drive, said secondary crankshaft remains stationary on throw shaft (6) and throw cams (9) orbit input axis (A). Under maximum load, said secondary crankshaft counter-rotates around throw shaft (6) one full counter-revolution in the opposite angular direction of torque input (X) per one full orbit of shaft (6) and said secondary crankshaft around axis (A). The throw radii of the two diametrically opposed throws of cams (9) remain parallel to a fixed plane in space and transmit torque to two separate axes offset from axis (A) (movement Y). Said secondary crankshaft cannot counter-rotate more than one counter-revolution per one orbit as to do so would increase the velocity and distance of stroke of one connecting rod (10) between axis (A) and (B) and decrease the velocity and distance of stroke of the other connecting rod (10) between axes (A) and (B). Thus each rod (10) transmits torque from axis (A) to axis (B) and torque reaction from axis (B) to axis (A) and forms a continuous feed back loop.

The point at which torque is exerted into the axis (B) assembly of components is between axis (B) and ring gears (13). Axis (B) acts as a fulcrum of a lever with ring gears (13) being the load and the radii of gears (13) being the radial arm of said lever. Said radii react to torque input by rotating around axis (B) at an angular velocity equal to torque input relative to the load opposing ring gear (13) rotation around axis (B).

Alternate Method of Construction

Same as described except that one planetary gear and one ring gear is used.

Said internal ring gear is a hollow cylinder with an internal ring gear on the inner circumference and an output axis shaft which forms the diameter axis center and rotational axis of said cylindrical ring gear.

Said external planetary gear is intermeshed with said ring gear and consists of a gear, a hollow cylindrical shaft which forms the diameter axis center of said planetary gear and two throw cams. The diameter axis center of each said throw cam is offset from the diameter axis center of said hollow shaft. The direction of said offset of each throw cam is diametrically opposite the direction of offset of the other throw cam relative to the diameter axis center of said hollow shaft.

One length axis end of one connecting rod is mounted by a bearing and bearing support on the circumference of each said planetary gear throw cam.

A carrier is mounted by bearings and bearing supports on said output axis shaft. Said carrier consists of two hollow cylindrical shafts which form a single unit. Each said carrier shaft is offset from the rotational axis of said carrier (said output axis shaft) and provides a rotational axis offset from said output shaft. Each said offset axis is diametrically opposite the other relative to said output axis.

Each length axis end of said planetary gear hollow shaft is supported on one carrier shaft by a carrier crankshaft. Each said carrier crankshaft is a short hollow cylindrical shaft, each length axis end of which is supported by a bearing and bearing support on one of the two said carrier shafts. The diameter axis center of each said cylindrical crankshaft is offset from the rotational axis of said bearings which support it on said carrier shaft so that said diameter axis center travels in orbit around said carrier shaft during carrier crankshaft rotation on said carrier shaft. Said offset is equal in distance to the throw radius of the input crankshaft.

As described, during direct drive, said carrier rotates around said output shaft axis carrying said planetary gear in orbit and rotation around said output axis.

Under maximum load, said carrier is stationary on said output shaft and each said carrier crankshaft rotates around the respective carrier shaft to which it is mounted carrying said planetary gear in orbit around two separate axes offset from said output axis.

One counter-balance is attached to one bearing support of each said carrier crankshaft so that the mass of said counter-balance is diametrically opposite to the direction of said offset of said carrier crankshaft offset shaft relative to the rotational axis of said carrier crankshaft.

Said two counter-balances are of sufficient mass and radius of orbit so as to generate a centrifugal force equal to the centrifugal force generated by said planetary gear, connecting rod ends and throw cams which orbit or rotate on axis (B).

Alternate Method of Construction

Said alternate method of construction is the same as described except that two lesser diameter external planetary gears intermesh with a larger diameter external central sun gear. The rotational axes of said two planetary gears, is parallel to the rotational axis of said central sun gear and output shaft. Said planetary gears drive said sun gear around the output shaft diameter center of said sun gear by two different rotational movements or a combination of said movements.

During direct drive, said planetary gears orbit and rotate around said sun gear output shaft diameter center at torque input velocity. During maximum torque multiplication, each said planetary gear rotates around each diameter center of the gear shaft which forms the rotational axis of each said planetary gear, at torque input velocity, while orbiting around said output shaft at torque input velocity. Planetary gears with a diameter equal to ninety percent of the diameter of said central sun gear would have a maximum torque multiplication ratio of one to ten and a maximum output shaft angular velocity reduction of ten to one.

Said planetary gears are supported on said output shaft by two gear carriers. Said carriers are two elongated bars, which are mounted by bearings on said output shaft, one on each side of said central sun gear. The mid-length axis center of each said carrier is mounted on said output shaft so that the length axis ends of both said carriers orbit around said output shaft. Both said planetary gears are supported by said carriers so that each length axis end of each rotational axis shaft of both said planetary gear are supported by a bearing located in each length axis end of each said carrier.

The invention claimed is:

1. a mechanism for driving a planetary gear transmission by variable movements to create a continuous range of torque multiplication ratios comprising;
   A. an input crankshaft comprised of an input shaft which rotates on a first axis and an input throw shalt which orbits around said first axis;
   B. a first member, attached to said input throw shaft so as to be free to rotate on said input throw shaft in the opposite angular direction of said input throw shaft orbit, at variable angular velocities, for creating variable movement;
   C. a second shaft, the cylindrical length axis of which is offset from, and parallel to, said first axis;
   D. two orbital crankshafts, each comprised of at least one orbital throw shaft, each said orbital throw shaft is free to orbit around an axis which is diametrically opposed to the other relative to said second shaft or to orbit around said second shaft at variable angular velocities, both orbital movements being in the angular direction of said input throw shaft orbit;
   E. at least one carrier member attached to said second shaft so as to be free to rotate on said second shaft in the angular direction of said input throw shaft orbit, for supporting said orbital crankshafts on said second shaft;
   F. two connecting members, each said connecting member is attached to said first member at an axis which is diametrically opposed to the other relative to said input throw shaft, and each said connecting member is connected to at least one said orbital throw shaft so as to transmit torque and reaction between said first member and said orbital throw shafts;
   G. at least one planetary gear connected to said orbital throw shafts so as to be driven by said variable movements;
   H. at least one ring gear of greater diameter than said planetary gear, for receiving torque from said planetary gear.

* * * * *